June 18, 1968     R. B. WILLI     3,388,889
MEANS TO SIGNAL INCIPIENT SHEAR PIN FAILURE
Filed June 8, 1967
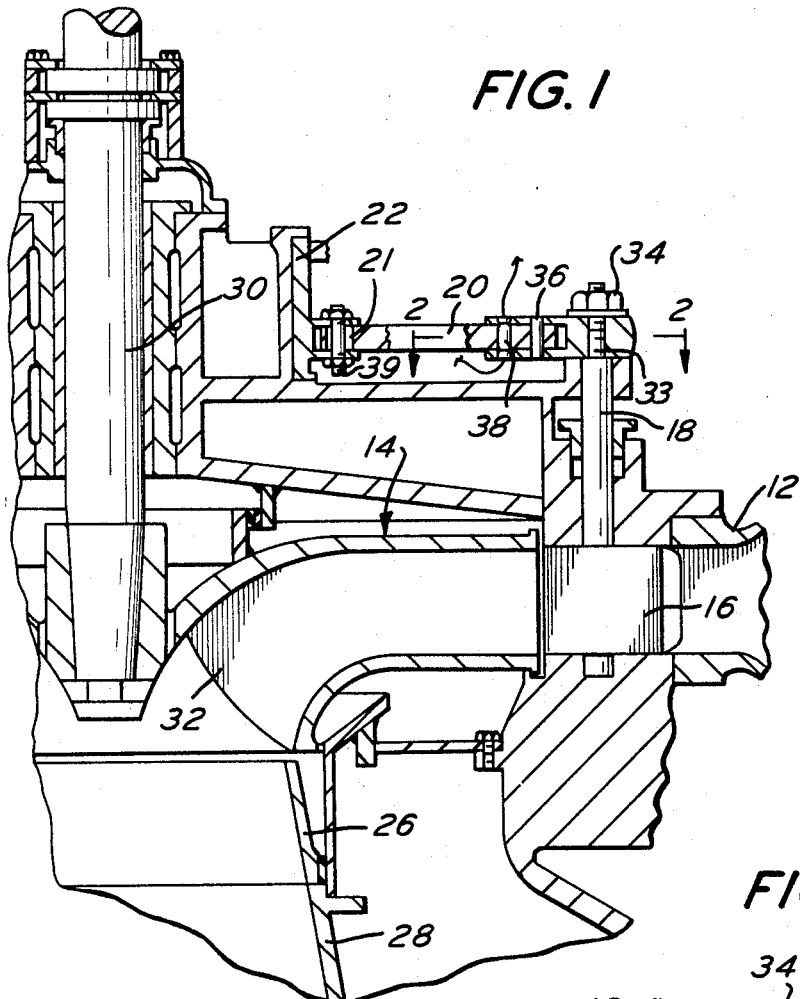
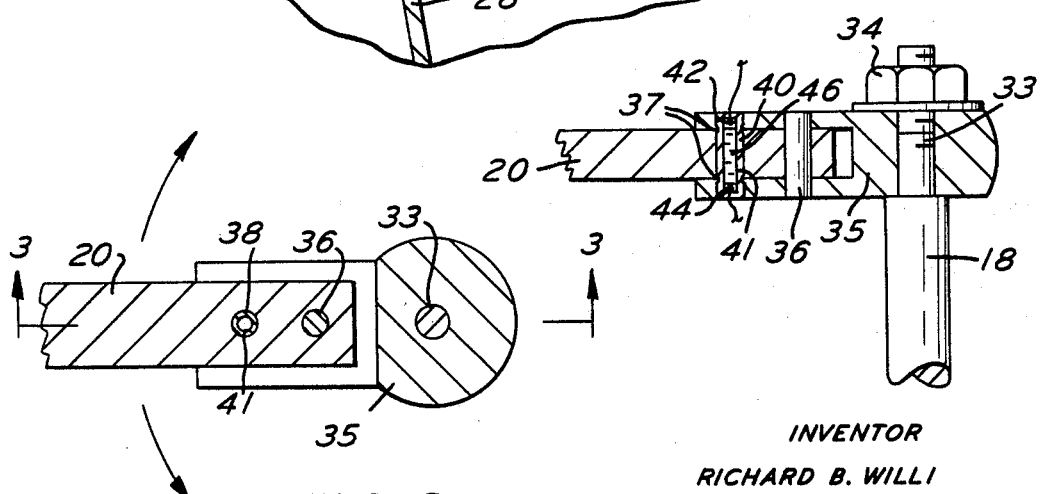
INVENTOR
RICHARD B. WILLI
BY Seidel & Gonda
ATTORNEYS.

United States Patent Office 3,388,889
Patented June 18, 1968

---

3,388,889
MEANS TO SIGNAL INCIPIENT SHEAR PIN FAILURE
Richard B. Willi, Norristown, Pa., assignor to Baldwin-Lima-Hamilton Corporation, Philadelphia, Pa., a corporation of Delaware
Filed June 8, 1967, Ser. No. 644,545
7 Claims. (Cl. 253—122)

ABSTRACT OF THE DISCLOSURE

Shear pins are provided to prevent damage to wicket gates in hydraulic machines in the event an obstruction blocks the normal closure of one or more wicket gates. Frequently prior to actual rupture of the shear pins, yielding will take place many operating cycles prior to rupture. To signal incipient shear pin failure a hole may be drilled into the shear pin. A pair of electrodes may be placed within the hole in the shear pin and closure of such electrodes would be maintained as long as the hole in the shear pin remains true and straight. Any deformation of the hole causes a rupture of a switch mechanism and disengagement of the electrodes and actuation of a signal system.

---

The present invention is directed to a means to signal incipient shear pin failure and more particularly to a means which will permit replacement of a shear pin prior to rupture of the same.

Shear pins have been provided in hydraulic machines such as hydraulic turbines and hydraulic pump-turbines in the linkage which connects the operating mechanism or shifting ring to the wicket gate stems. The shear pins are provided to prevent damage to the wicket gate in the event an obstruction blocks normal closure of one or more such gates. It has been found that yielding will frequently take place many operating cycles prior to rupture of the shear pin. It is desirable to replace the shear pin prior to rupture of the same, however, there has been no convenient means of knowing when yielding has taken place except through physical inspection of each pin.

It is an object of the present invention to provide a means to signal incipient shear pin failure.

It is another object of the present invention to provide a means to signal incipient shear pin failure which is simple to construct and yet highly effective in use.

It is still another object of the present invention to provide a means to signal incipient shear pin failure which will actuate a signal mechanism prior to actual rupture of the shear pin so that the pin may be immediately replaced.

It is a further object of the present invention to provide a means to signal incipient shear pin failure wherein the need to physically inspect each shear pin is eliminated.

Other objects will appear hereinafter.

The above and other objects are accomplished by means of the present invention. In order to determine when yielding of the shear pin has taken place, a central hole is drilled into the shear pin. A pair of electrodes is inserted into the hole. Closure of the electrodes will be maintained as long as the hole remains true and straight. Any deformation of the hole will cause disengagement of the electrodes which results in a signal which may be transmitted to any convenient location.

While the invention is not limited to any particular means for accomplishing these objects, a typical means which may be utilized is a close fitting glass tube inserted into the hole in the shear pin. Electrodes will be provided at opposite ends of the glass tube. The glass tube will be filled with a fluid or powder material such as mercury or any other material which would permit the two electrodes at opposite ends of the glass tube to make contact. Deformation of the hole due to yielding of the shear pin would cause the glass tube to break and allow the material within the glass tube to escape and thus break contact between the electrodes. A signal system would be actuated and the defective shear pin replaced prior to rupture of the same.

For the purpose of illustrating the invention there is shown in the drawings a form which is presently preferred; it being understood, however, that this invention is not limited to the precise arrangements and instrumentalities shown.

FIGURE 1 is a partial section view of an hydraulic machine embodying the principles of the present invention;

FIGURE 2 is a section view taken along line 2—2 in FIGURE 1; and

FIGURE 3 is a section view taken along line 3—3 in FIGURE 2.

Referring now to the drawing in detail, wherein like numerals indicate like elements, there is shown in FIGURE 1 a pump-turbine designated generally by the reference numeral 10. While the turbine shown is of the low specific speed Francis type, it is to be understood that this invention is not limited to a specific type of turbine or to any type of hydraulic machine.

The pump-turbine 10 is provided with a spiral casing 12. Water flows through the casing 12 to the runner 14 of the pump-turbine when it is operating as a turbine. The pump-turbine 10 is provided with a plurality of wicket gates 16 which are rotatably mounted by stems 18. Each of the stems 18 is connected to an arm 20 and each arm 20 is in turn connected to a shifting ring 22. A slot 21 permits desired movement of the arm 20. Movement of the shifting ring 22 will control the adjustment of the wicket gates 16 by rotating the stems 18. The mechanism for operating the wicket gates will be set forth in greater detail hereinafter.

Water which enters the pump-turbine 10 through the spiral casing 12 is adapted to flow through a discharge ring 26 into a draft tube 28. The pump-turbine 10 is provided with a centrally mounted shaft 30. The runner 14 is connected to the lowermost end of the shaft 30. The runner 14 has a plurality of blades 32 attached thereto. The pump-turbine 10 operates in a conventional manner and the details thereof need not be further discussed herein.

The stems 18 to which the wicket gates 16 are fixedly secured have threaded extensions 33 at their uppermost ends. Suitable securing means 34 fixedly secure the stems 18 to the brackets 35. Each of the brackets 35 are connected to an arm 20.

The brackets 35 are connected to the arm 20 by means of a connecting pin 36 and a shear pin 38. Each arm 20 is connected to the shifting ring 22 by suitable mechanical securing means indicated generally as 39. Through the linkage as described, rotation of the shifting ring 22 will cause rotation of the wicket gates 16.

The shear pin 38 is provided with weakened portions 37. The weakened portions 37 on the shear pin insure that should an obstruction block the normal closure of one or more of the wicket gates 16, the shear pin will yield or rupture. By sacrificing the shear pin more extensive damage to the linkages and wicket gates is prevented.

Frequently, prior to actual rupture of the shear pin, yielding will take place. When such yielding takes place, it is desirable to replace the shear pin. To this end, a central hole 41 is provided in the shear pin 38. A suitable glass tube 40 may be inserted in the hole 41. The glass tube 40 may be closely fitted within the hole and be retained in position by friction. Other suitable means such as a porous plug for retaining the glass tube may also be used.

Electrodes 42 and 44 are provided at opposite ends of the glass tube 40. Contact between the electrodes 42 and 44 is established and maintained by providing a fluid medium 46 within the glass tube 40. The fluid medium will be a conductor and may be mercury or the like. A conductive powder may also be utilized rather than a fluid medium and the invention is not limited to any particular type of material within the glass tube. It lies within the scope of this invention to utilize a conductive frangible plug which does not incorporate a fluid medium. The electrodes 42 and 44 may be connected to a suitable signal means.

When yielding of the shear pin takes place, which frequently occurs prior to rupture, the hole 41 within which the glass tube 40 is mounted will slightly deform. Upon deformation of the hole, the glass tube will be broken and the fluid or powder therein will escape therefrom. When this occurs, contact between the electrodes 42 and 44 will be broken and a suitable signal will indicate the fact that the shear pin has been slightly deformed. The shear pin 38 may then be replaced prior to rupture of the same.

The signal mechanism may be any suitable means. For example, contact between the electrodes may be effective to illuminate a bulb. When contact is lost, the bulb will be turned off. It will then be known that the shear pin should be replaced. The foregoing is illustrative only and a noise signaling system or any other signaling system may be used without departing from the invention.

The term electrode as used herein is not limited to a particular type of contact and includes any electrical terminal or electrical contact.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for signaling incipient shear pin failure comprising a shear pin having a hole therein, a conductive liquid medium within said hole, a pair of electrodes within the hole in said shear pin, said electrodes being electrically coupled through said medium, means causing said electrodes to emit a signal responsive to loss of the liquid medium in said hole indicating that said shear pin and the hole therein have been slightly deformed whereby a shear pin needing replacement may be replaced prior to failure thereof.

2. Apparatus as set forth in claim 1 wherein said means includes a frangible member retained within the hole in said shear pin, the liquid medium being in said frangible member, said electrodes being mounted in said frangible member, whereby slight deformation of said shear pin will cause destruction of said frangible member permitting the liquid medium to escape so that the electrical coupling between said electrodes is broken, and a signal may be emitted.

3. Apparatus as set forth in claim 2 wherein the liquid medium within the frangible member is mercury and the frangible member is composed of a vitreous substance, said hole being centrally located in said shear pin.

4. A hydraulic machine comprising a runner, a plurality of wicket gates, means coupled to said wicket gates for moving said gates, said means including a shear pin between two components, signaling means for signaling incipient failure of said shear pin as a result of forces applied thereto by said wicket gates in the event that an obstruction blocks the normal movement of one or more of said wicket gates.

5. A hydraulic machine as set forth in claim 4 wherein said shear pin has a hole therein, said signaling means includes a pair of electrodes within the hole in said shear pin, said electrodes being electrically coupled through a conductive liquid within said hole, the conductive liquid maintaining coupling of said electrodes as long as the hole in said shear pin remains true and straight.

6. Apparatus as set forth in claim 5 wherein said signaling means includes a frangible member retained in the hole in said shear pin within which said electrodes are mounted, said conductive liquid being within said frangible member, said frangible member being broken upon deformation of said shear pin whereby said conductive liquid flows from said frangible member and the electrical coupling between said electrodes is broken.

7. Apparatus as set forth in claim 6 wherein said conductive liquid in said frangible member is mercury, said frangible member being a vitreous cylinder and said electrodes being at opposite ends of said vitreous cylinder.

References Cited

UNITED STATES PATENTS

| 2,503,141 | 4/1950 | Stone | 85—62 X |
| 2,600,029 | 6/1952 | Stone | 85—62 X |
| 2,930,579 | 3/1960 | Boyd et al. | |

EVERETTE A. POWELL, JR., *Primary Examiner.*